Patented Dec. 8, 1925.

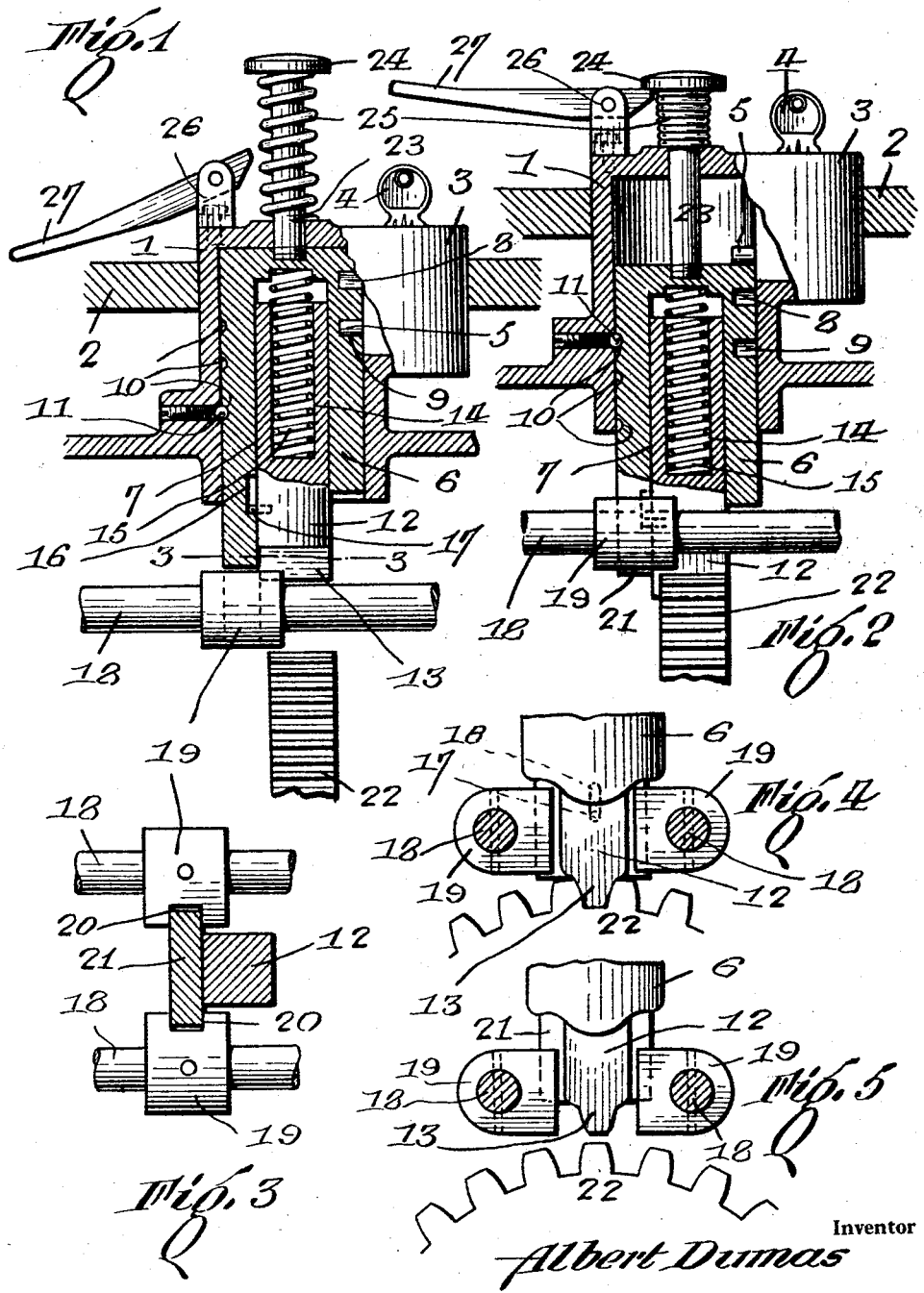

1,564,220

UNITED STATES PATENT OFFICE.

ALBERT DUMAS, OF SOREL, QUEBEC, CANADA, ASSIGNOR TO DUMAS TRANSMISSION LOCK & MACHINERY COMPANY LIMITED, OF ST. JOSEPH DE SOREL, QUEBEC, CANADA.

LOCKING DEVICE FOR MOTOR VEHICLES.

Application filed March 14, 1924. Serial No. 699,320.

*To all whom it may concern:*

Be it known that I, ALBERT DUMAS, a subject of the King of Great Britain, residing at Sorel, Province of Quebec, Canada, have invented certain new and useful Improvements in Locking Devices for Motor Vehicles; and I do hereby declare that the following is a full, clear, and exact description of the invention, such as will enable others skilled in the art to which it appertains to make and use the same.

The present invention pertains to a locking device for motor vehicles and resides in a modification of the construction shown in my pending United States application Serial No. 646,276, filed June 18th, 1923.

The principal object of the invention is the provision of a device which may lock the transmission mechanism of an automobile either absolutely or in such a manner that the vehicle may be moved from place to place by pushing. It is desirable to lock the vehicle in this manner when, for example, it is in a garage.

The invention is adaptable particularly to automobiles constructed with shifter rods. In order to accomplish the objects of the invention, the shifter rods are provided with grooved collars. The locking mechanism comprises a slidable member adapted for reception in the grooves of the collars. When the slidable member is in this position, the vehicle may be pushed from place to place but it cannot be successfully driven since the speed changing mechanism is obstructed.

The slidable member carries a toothed member which engages one of the transmission gears when the slidable member is moved farther into the grooves of the collars. The tooth member thus locks the vehicle absolutely against movement.

The invention further includes a construction for locking the slidable member in adjusted positions, so that only the speed changing mechanism is obstructed or so that both this mechanism and the gear are locked, as desired.

The invention is fully disclosed in the following description and in the accompanying drawings in which:

Figure 1 is a sectional view, partly in elevation, of the device in open position;

Figure 2 is a similar view showing the device in locking position;

Figure 3 is a section on the line 3—3 of Figure 1;

Figure 4 is a fragmentary elevation at right angles to Figure 2; and,

Figure 5 is a similar elevation showing a slightly different relative position of parts.

The device comprises an exterior housing 1 adapted for attachment to the floor 2 or similar part of an automobile. The housing is of substantially cylindrical configuration, having also an extended portion 3 for containing a lock. The latter is indicated by the key 4 and bolt 5 thereof. As will be seen from Figures 1 and 2, the bolt is adapted to extend into the interior of the housing 1.

The housing contains a cylindrical plunger 6 having a central longitudinal cavity 7. The plunger is formed with a pair of recesses 8 and 9 adapted to receive the bolt 5 of the lock. Opposite the recesses are formed small notches 10 adapted to receive a spring pressed ball 11 contained in the wall of the housing 1. The notches are so arranged with reference to the recesses 8 and 9 that one of them receives the ball when the bolt 5 is projected into one of the recesses or lies on the top of the slidable plunger 6.

The cavity 7 of the plunger contains a slidable stem 12 formed with a tooth 13 at its lower end. The stem is recessed from its upper end as at 14 wherein is contained a spring 15 bearing against the upper end of the plunger 6. The inner wall of the plunger is formed with a slot 16 receiving a pin 17 extending from the stem 12. Due to this construction, the stem 12 is prevented from rotating relatively with the plunger.

The mechanism thus far described is so arranged that it lies slightly above the spaced shifter rods 18. In accordance with the invention each of these rods has fixed thereto a collar 19 formed with a groove 20. At the lower end of the plunger 6 is provided an extension 21 adapted to move between the collars 19 and the sides of which are receivable in the grooves 20. Beneath the rods 18 is disposed the usual reverse and low speed sliding gear 22. The stem 12 is so arranged with reference to this gear that the tooth 13 is adapted for reception between the gear teeth as shown in Figure 4. It is also to be noted that the tooth 13 is of such size that it may pass between the collars 19 as is apparent from Figures 3, 4 and 5.

To the top of the plunger 7 is secured a finger 23 extending through the top of the housing 1 and provided at its upper end with a head 24. The finger is surrounded by a spring 25 bearing against the lower surface of the head and the top of the housing. To the top of the housing is also secured a pair of ears 26 between which is pivoted a lever 27 adapted to engage the under side of the head.

In Figure 1 the device is illustrated with the locking mechanism raised so that it does not interfere with the propelling gear of the vehicle. When it is desired to lock the vehicle absolutely against movement the lock bolt 5 is withdrawn from the interior of the housing and the plunger 6 is pushed down as far as possible by foot pressure on the head 24. The bolt is now projected again into the interior of the housing whereby it serves to stop upward movement of the slidable parts due to the action of the spring 25. In this lowered position, the extension 20 is received in the grooves of the collars 19 and the tooth 13 locks the gear 22.

Under certain conditions it is desired to lock the vehicle in such a manner that it cannot be driven, but still may be moved from place to place as in a garage. In order to provide for this situation, the movable parts are so arranged that the extension 21 may be received in the grooves of the collars 19 while the tooth 13 is free from the gear 22. To adjust the device in this manner, the bolt 5 is withdrawn from the interior of the housing and the plunger 6 is moved downwardly until the recess 8 is disposed to receive the bolt. The latter is then projected into the recess 8, whereby the extension 21 and tooth 13 assume the position shown in Figure 5. Since the extension 21 is received in the grooves of the collars 19, the speed of the vehicle cannot be changed and therefore cannot be successfully driven by an unauthorized person. At the same time, it is possible to push the car from place to place since the tooth 13 is free from the gear 22.

It is often difficult to remove the tooth 13 from the gear due to the wedging effect caused by the tendency of the gear to move against the tooth. In such a case, the tooth may be pulled out of the gear by a sharp blow struck by the foot on the lever 27 which acts to shift the entire slidable mechanism.

While a specific embodiment of the invention has been illustrated and described, it is to be understood that various alterations in the details of construction may be made without departing from the spirit of the invention as indicated by the appended claim.

Having thus fully described the invention, what I claim as new and desire to protect by Letters Patent is:—

In combination with a pair of shifter rods and an automobile gear disposed at one side of the rods, a locking device disposed at the other side of the rods and comprising a slidable member adapted for locking engagement with said rods, a toothed member carried by said slidable member and adapted for engagement with said gear, said slidable and toothed members being substantially coextensive towards the rods, and means for locking said slidable member in adjusted positions, whereby the slidable member may be engaged with the rods independently of the engagement between the toothed member and the gear.

In witness whereof I have hereunto set my hand.

ALBERT DUMAS.